Inventors
ROBERT JAMES REDDING
STEPHEN GREGORY WARDER
By
Attorneys

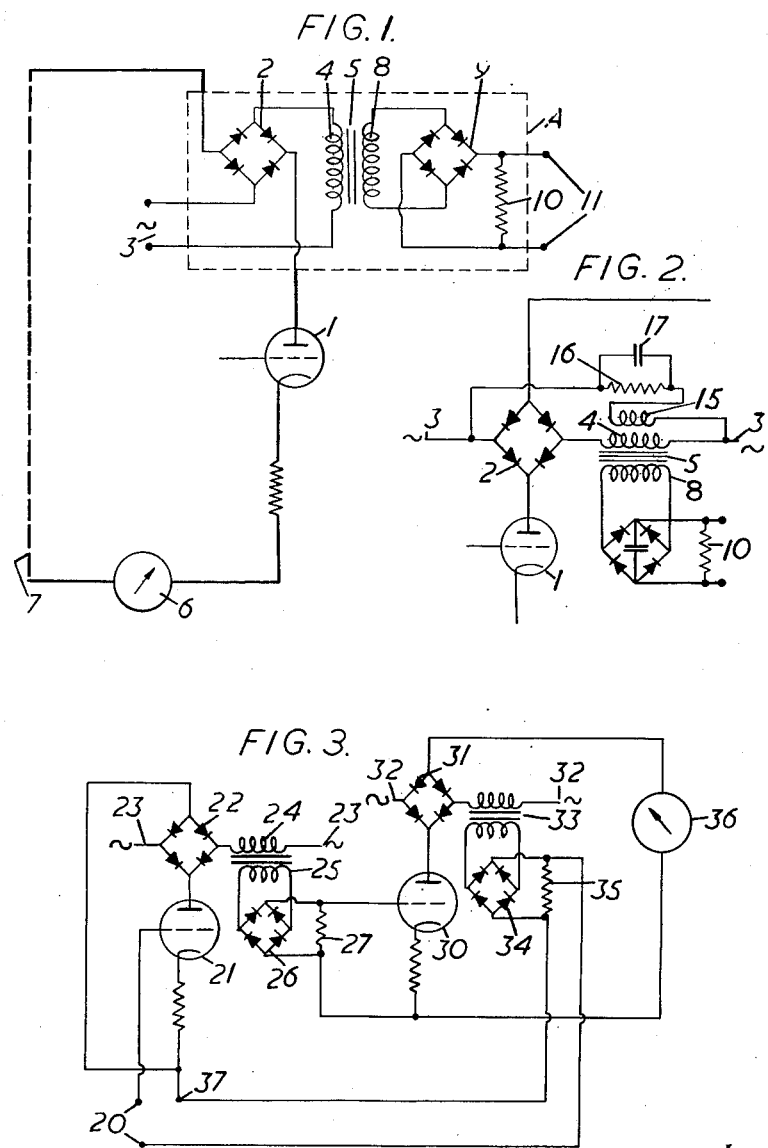

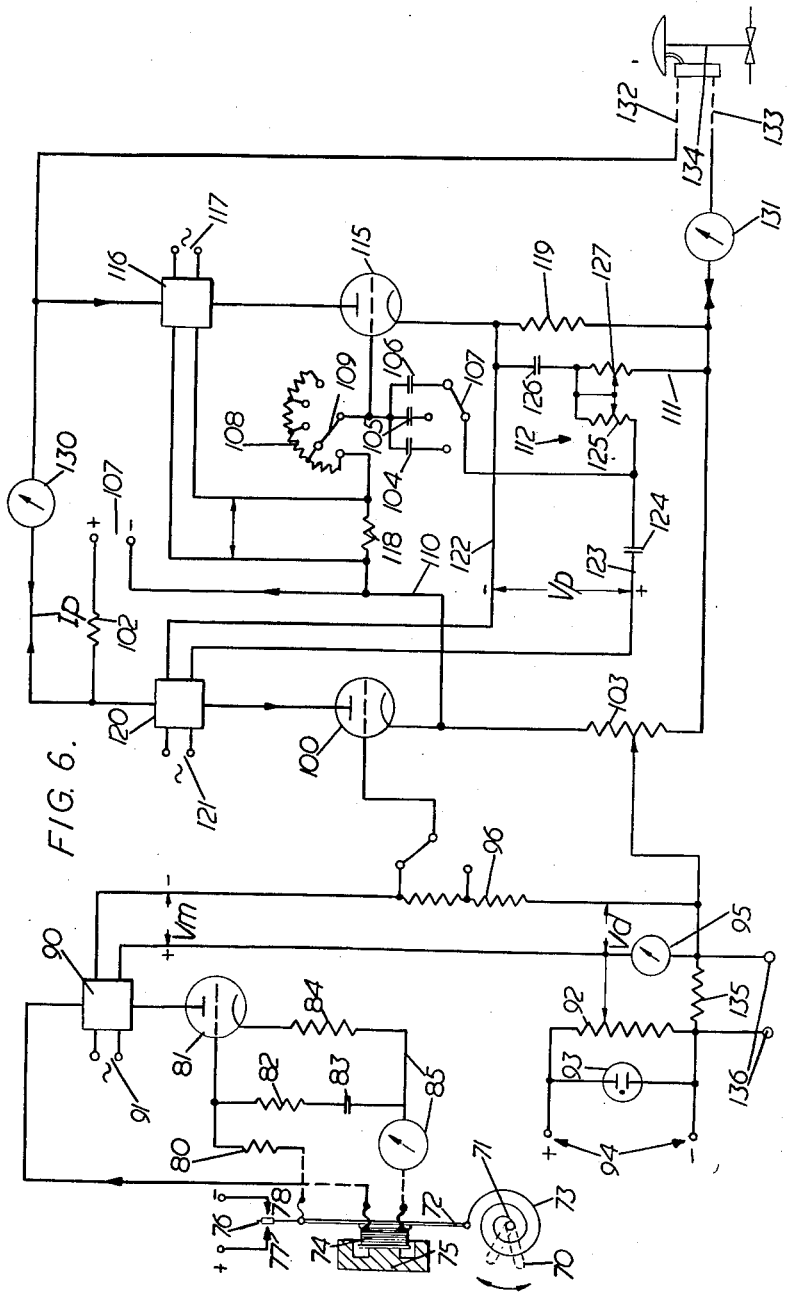

United States Patent Office 3,058,066
Patented Oct. 9, 1962

3,058,066
ELECTRICAL CIRCUIT HAVING DIRECT CURRENT VOLTAGE OUTPUT PROPORTIONAL TO A VARIABLE DIRECT CURRENT
Robert James Redding and Stephen Gregory Warder, Chiswick, London, England, assignors to Evershed & Vignoles Limited, London, England, a British company
Filed Nov. 18, 1957, Ser. No. 697,022
Claims priority, application Great Britain Nov. 19, 1956
20 Claims. (Cl. 328—26)

In electrical circuits designed for such purposes as indication, telemetering, control and so forth, it is usual to establish a direct current proportional to a particular measurement, for example by means of the arrangement described in patent specification No. 589,423. Sometimes, however, a voltage proportional to the measurement is required. If the current is the anode current of a valve, this voltage may be obtained by the inclusion of a resistance in the anode circuit of the valve, but the voltage drop produced across the resistance is necessarily appreciably less than the supply voltage and furthermore it is not isolated from the remainder of the circuit, as is frequently required.

According to the present invention the circuit includes a full-wave rectifier having the primary winding of a current transformer connected in its alternating current input circuit, and the secondary circuit of the transformer includes a resistance across which appears a voltage substantially proportional to the direct current in the circuit. The reason for this is that if the small losses in the rectifier are ignored, the current flowing in the primary winding of the transformer, and hence also that in the secondary winding is proportional to the direct current in the circuit. Accordingly the voltage across the resistance connected in the secondary circuit of the transformer is also proportional to this current and may be used either with or without full-wave rectification for the purpose required. This voltage is completely isolated from the direct current circuit and may be quite large depending on the ratio of the transformer; for example it may be in excess of the direct current supply voltage. Nevertheless, by reason of the impedance match the loading imposed on the direct current circuit is comparatively small.

Any inaccuracies which may be introduced by ignoring the losses in the supply rectifier are very small, being due to the leakage and capacitance. These losses may, for example, be of the order of 2% of the working range so that the voltage derived from the secondary winding of the current transformer is about 2% greater than the theoretical value. In many applications this is not of importance but if necessary this minor discrepancy may be overcome by the provision of an additional primary winding on the transformer acting in opposition to the first and carrying a current representative of the rectifier loss.

Circuits in accordance with the invention most commonly take the form of valve circuits but the invention is equally applicable to circuits where the valve is replaced by a transistor or even by a fixed or variable resistance, the only essential requirement being that the direct current load shall be supplied from a full-wave rectifier such as a full-wave bridge, voltage doubler or push-pull arrangement.

Valve circuits in accordance with the invention may be used for a number of purposes. For example, such a circuit may be used as a direct current amplifier by connecting the rectifier to supply the anode current of a thermionic valve whose grid potential is controlled by the signal to be amplified. The voltage derived from the secondary winding of the transformer is then rectified and applied to the grid of a second valve whose anode current represents the amplified output of the circuit. The anode current of this second valve may be supplied by a further full-wave rectifier having the primary winding of a further current transformer connected in its alternating current input circuit. The rectified voltage derived from a resistance connected in the secondary circuit of this transformer is then fed back to the signal circuit so as to improve the linearity of the amplification and the input impedance.

A circuit arrangement in accordance with the invention is also useful when included as part of an integrating circuit. The basic principle used in such circuits is that if a voltage representing the quantity to be integrated is applied to a condenser, the charge on the condenser and hence the voltage across it after a predetermined time represents the integral with respect to time of the quantity concerned. This principle depends on a linear relationship between the voltage to be integrated and the current flowing into the condenser, but in practice the current flowing is progressively reduced by the back voltage established across the condenser. This back voltage produces an exponential rather than linear rise in the charge on the condenser, and hence in its voltage, thus limiting the usefulness of the circuit. This disadvantage may be overcome by introducing an additional voltage into the integrating circuit of a magnitude equal and opposite to that of the condenser so that the effect of the condenser voltage is cancelled out and the linear relationship between the voltage to be integrated and the current flowing into the condenser is maintained.

This additional voltage may be derived from the secondary winding of the current transformer of a circuit in accordance with the invention, the rectifier of the circuit being connected to supply the anode current of a thermionic valve whose grid potential is controlled by the voltage across the integrating condenser. The anode current of this valve is accordingly proportional to the voltage across the condenser and the secondary voltage of the transformer may accordingly be proportioned so as to be equal to that across the condenser, thus canelling it out as required.

A similar principle may be applied to a differentiating circuit. In such a circuit the voltage to be differentiated (which may, of course, be derived from a corresponding current) is used to charge a condenser through a resistance. Provided the voltage is steady, the condenser reaches a steady state of charge and no current flows through the series resistance. Any change in the voltage, however, produces a charging or discharging current and the voltage thereby developed across the series resistance provides a measure of the rate of change of the voltage to be differentiated. The voltage across the resistance must be kept small with respect to the voltage to be differentiated and this may be achieved by feeding back a voltage derived from the secondary winding of the transformer of a circuit in accordance with the invention. The rectifier of the circuit is connected to supply the anode current of a thermionic valve whose grid potential is controlled by the voltage across the series resistance referred to above. The anode current of the valve is accordingly proportional to the required derivative and the output voltage from the secondary winding of the transformer may thus be proportioned so as to cancel out the voltage across the series resistance.

A circuit in accordance with the invention also has a number of applications to electrical process controllers. Thus the anode current of a thermionic valve may be adjusted in accordance with the measured value of the quantity to be controlled and a voltage proportional to this current may then be derived by means of a circuit in accordance with the invention. After a current proportional to the error in the system has been established, a current proportional to the integral of this error may be obtained by means of an integrating circuit as described above.

The invention will now be described in more detail by way of example with reference to the accompanying drawings in which:

FIGURE 1 is a diagram of the basic circuit of the invention;

FIGURE 2 shows a modification of the circuit of FIGURE 1;

FIGURE 3 shows the circuit in its application to a direct current amplifier;

FIGURE 6 is a circuit diagram of a process controller.

Figure 4:
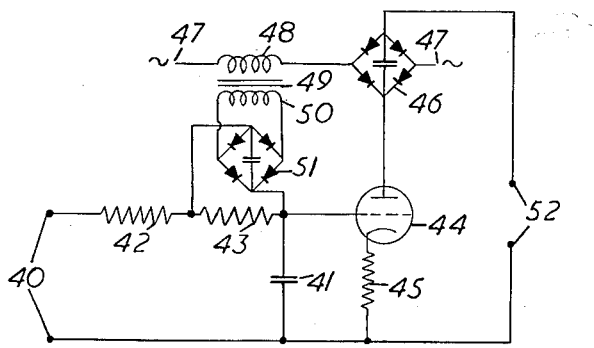
FIGURE 4 shows the circuit adapted for integrating purposes.

Turning first to FIGURE 1, a thermionic valve 1 has its anode current supplied by way of a bridge rectifier 2 connected to a source of alternating current 3. The supply circuit to the rectifier also includes the primary winding 4 of a current transformer 5. The anode circuit of the valve 1 is shown as including a meter 6 and other unspecified components represented by the dotted line 7. No grid circuit for the valve is shown since this will depend on the nature of the other components in the circuit.

Whatever the value of the anode current of the valve, however, a corresponding alternating current will flow to the rectifier 2 and consequently through the primary winding 4 of the transformer 5. Consequently, a further proportional current will be induced in the secondary winding 8, the magnitude of which will depend on the ratio of the transformer. This current is rectified by means of a bridge rectifier 9 and caused to flow through a resistance 10. As a result a direct current voltage appears across terminals 11 connected to the ends of the resistance 10 and this voltage is directly proportional to the direct current in the valve circuit (if the losses in the rectifier are ignored). The components of the circuit contained within the dotted line A constitute a unit which may be used for a variety of purposes as will be clear from a description of the following figures of the drawings.

If, in any particular application, it is necessary to take into account the losses in the rectifier, so that the output voltage is strictly proportional to the direct current, the modified circuit of FIGURE 2 may be adopted. This is identical with the circuit of FIGURE 1 with the exception that an additional primary winding 15 is provided for the current transformer 5. This additional primary winding is wound in opposition to the main primary winding 4 and is connected between the alternating current supply terminals 3 in series with the parallel combination of a resistance 16 and a condenser 17. The effect of the current flowing in the winding 15 is to decrease the current in the secondary winding 8 and hence the voltage across the resistance 10. The magnitudes of the components 16 and 17 are selected in accordance with the loss in the rectifier 2 with the result that the voltage output across the resistance 10 is strictly proportional to the anode current of the valve 1. The same result can also be obtained by replacing the resistance 16 and condenser 17 by a dummy rectifier identical with the rectifier 2.

FIGURE 3 shows the basic circuit of FIGURE 1 used as part of a direct current amplifier. The input signal is applied at the terminals 20 between the grid and cathode of a valve 21 supplied from a rectifier 22. The rectifier in its turn is connected to a source of alternating current 23 by way of the primary winding 24 of a current transformer. The current in the secondary winding 25 of the transformer is rectified by means of a rectifier 26 and caused to flow through a resistance 27. Consequently the voltage across the resistance 27 is proportional to the anode current of the valve 21 and hence to the signal applied to the terminals 20.

The voltage across the resistance 27 is applied between the grid and cathode of a further valve 30 supplied by a rectifier 31 from a source of alternating current 32. The supply circuit to the rectifier 31 also includes the primary winding of a current transformer 33 and the secondary current of this transformer is rectified by means of a rectifier 34 and caused to flow through a resistance 35. The output of the amplifier is represented by the anode current of the valve 30, the gain being related to the ratio of the transformer 24, 25. This anode current is shown flowing through an external circuit, including a meter 36. The voltage across the resistance 35 is also proportional to the anode current of the valve 30 and may be used for feed-back purposes in order to improve the linearity and input impedance of the amplifier. The voltage across the resistance 35 is thus shown connected back between one of the terminals 20 and a terminal 37.

FIGURE 4 shows an integrating circuit embodying the basic circuit of FIGURE 1. The voltage to be integrated is applied between terminals 40 and charges an integrating condenser 41 through a resistance 42 and a further resistance 43. The normal form of integrating circuit does not include the resistance 43, and as a result the voltage across the condenser 41 does not accurately represent the required integral since the rate of charge decreases exponentially due to the back voltage across the condenser.

In the circuit of FIGURE 4 this disadvantage is overcome by connecting the condenser voltage between the grid and cathode of a valve 44 having a cathode resistance 45. The anode current of the valve is supplied from a rectifier 46 connected to a source of alternating current supply 47 by way of the primary winding 48 of a current transformer 49. The anode current of the valve 44 will vary with the voltage of the condenser 41 and for the reasons previously explained the current in the secondary winding 50 of the transformer will vary likewise. This current is rectified by means of a rectifier 51 and is caused to flow through the resistance 43. By suitable proportioning of the circuit, the voltage across the resistance 43 can be made equal and opposite to that across the condenser 41, thus cancelling out the effect of the back voltage of the condenser and giving linear integration. Thus the anode current of the valve 44 will vary linearly with this integral and the output of the circuit is obtained at terminals 52. The valve 44 is heavily self-biased so that it has low gain in order to give the required linear relationship between its anode current and the voltage across the condenser 41. With this arrangement the voltage across the condenser 41 may rise considerably above that across the terminals 40 which corresponds to the quantity to be integrated. In this way long time constants may be obtained with reasonably sized components. In other words, the whole circuit has a gain equivalent to infinity but with a chosen time constant.

Figure 5:
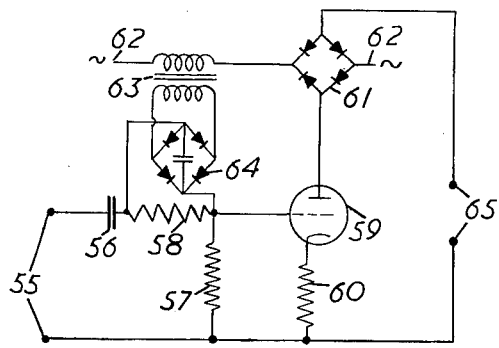
FIGURE 5 shows the circuit adapted for use in a differentiating network.

FIGURE 5 shows the application of a similar principle to a differentiating circuit. The voltage to be differentiated is applied between terminals 55 to charge a condenser 56 in series with a resistance 57 and a further resistance 58, the latter not normally being included in a differentiating circuit. If the voltage between the terminals 55 is steady, the condenser 56 reaches a steady state of charge. As soon as there is any variation in the voltage, however, a current is caused to flow through the resistance 57, thus giving a voltage across the resistance which is proportional to the required derivative. It is important to keep the voltage across the resistance 57 small with respect to the voltage to be differentiated across the terminals 55 and for this purpose the voltage across the resistance 57 is applied between the cathode and grid of a valve 59, having a cathode resistance 60 and functioning in the same manner as the valve 44 of FIGURE 4. The valve is supplied from a rectifier 61 connected to a source of alternating current 62 in series with the primary winding of a current transformer 63. The secondary current of the transformer is rectified by means of a rectifier 64 and caused to flow through the resistance 58. By suitable proportioning of the circuit the voltage across the resistance 58 can be arranged to be equal and opposite that across the resistance 57 and this gives the required condition, namely that the resultant voltage is small in relation to the voltage to be differentiated. The anode current of the valve 59 will vary with the voltage across the resistance 57, that is to say in accordance with the required derivative and the output of the circuit is taken from the terminals 65.

In the circuit diagrams of FIGURES 3, 4 and 5 and also of FIGURE 6 about to be described, no bias to the various valves is shown, although in practice most standard thermionic valves need a negative potential of several volts with respect to the cathode applied to the grid to give zero current. Since to obtain full operation of the circuits the current through each valve should be zero when the control voltage applied between the grid and cathode is also zero, a suitable bias voltage (not shown) will, in general, be included in series with the grid to cathode circuit.

FIGURE 6 is a circuit diagram of a process controller using the basic circuit of FIGURE 1 in a number of different places to give an output current having components respectively proportional to the error in the system under control and also to the integral and the derivative of this error. The input to the controller is derived from a measuring instrument in the form of a force or torque applied to an arm 70, pivoted at 71 and controlling the movement of a lever 72 by way of a coiled spring 73. The lever 72 is balanced by means of the repulsive force exerted between a coil 74 carried by the lever and a pot magnet 75. The end of the lever carries a moving contact 76 playing between positive and negative fixed contacts 77 and 78 respectively. Under equilibrium conditions the torque applied to the arm 70 balances the force on the coil 74 with the result that the current in this coil is proportional to the measured value of the quantity under control, as shown by the measuring instrument attached to the arm 70.

As soon as the torque varies in one direction or the other the lever 72 is moved so that the moving contact 76 engages either the fixed contact 77 or 78. The moving contact 76 is connected via a resistance 80 to the grid of a valve 81 which, in its turn, is connected through a resistance 82 and a condenser 83 to the lower side of a cathode resistance 84. Consequently, depending on the direction of movement of the lever 72, the charge on the condenser 83 is either increased or decreased to produce a corresponding increase or decrease in the anode current of the valve 81, thus adjusting the force exerted on the coil 74 and restoring the equilibrium of the lever 72. This state of equilibrium is then maintained by the charge on the condenser 83 until there is a further change in the torque applied to the arm 70. The outcome is that the anode current of the valve 81 varies in accordance with the measured value of the quantity to be controlled and is shown as a meter 85.

The anode current of the valve 81 is controlled by a unit 90 which contains the components of the basic circuit enclosed within the dotted lines A of FIGURE 1. The unit is supplied from a source of alternating current 91 and consequently produces a direct current output voltage $Vm$ proportional to the measured value of the quantity under control. This voltage is connected in opposition to a voltage $Vd$ correspondingly proportional to the desired value of the quantity under control. This voltage is tapped from a potentiometer resistance 92 connected across a neon stabiliser tube 93 supplied from a source of direct current 94. The voltage $Vd$ is therefore stable and is shown by the voltmeter 95. The resultant of the two voltages $Vm$ and $Vd$ representing the difference between the measured value and the desired value of the quantity under control is consequently proportional to the error in the system and appears across a resistance 96 so as to act between the grid and cathode of a valve 100. The resistance 96 has a tapped point enabling its value to be adjusted in accordance with the required proportional range.

As a result of these connections the anode current of the valve 100 varies with the error in the system but is, of course, unidirectional. A constant direct current from a source 101 connected in parallel with the valve 100 flows through a resistance 102 and then in opposition to the anode current of the valve through the remainder of the external circuit. The magnitude of this current is such that when the error in the system is zero the constant current exactly cancels out the anode current of the valve 100. As a consequence the resultant current shown as $Ip$ varies in magnitude and direction with the error in the system. The voltage across the resistance 96 is applied to a variable tapping in a resistance 103 so that by adjusting this the magnitude of the change in the anode current for a given error can be correspondingly adjusted. This resistance 103 therefore represents the proportional band adjustment. Larger adjustments to the proportional band are effected by means of the tapping in the resistance 96 previously referred to.

The voltage drop across the resistance 103 caused by the passage of the current $Ip$ is used for the input to the integrating circuit. This circuit includes three integrating condensers 104, 105 and 106 of differing magnitudes which can be selected at will by means of a contact arm 107. Similarly different steps of a resistance 108 may be selected by means of an arm 109. The voltage across the resistance 103 is led to the resistance 108 by way of a conductor 110, while the other connection is by way of a conductor 111 and a differentiating network 112, to be described in more detail later.

The voltage across the selected integrating condenser is supplied to the grid of a valve 115 having a large cathode resistance 119 whose anode current is supplied from a unit 116 similar to the unit 90. This is energised from a source of alternating current 117 and its direct current output is connected across a resistance 118 in order to cancel out the back voltage of the integrating condenser in the manner described in connection with the circuit of FIGURE 4. As a result the anode current of the valve 115 includes a component representing the integral of the error current $Ip$.

The anode current of this valve is also required to include a component proportional to the derivative of the error current $Ip$ and for this purpose a voltage proportional to the error current is derived from a unit 120 similar to the units 90 and 116 and supplied from a source of alternating current 121. It is this unit which supplies the anode current of the valve 100. The output voltage of the unit 120 is accordingly proportional to the error current and is denoted as $Vp$ between conductors 122 and 123. This voltage is applied to the differentiating network 112 which includes a condenser 124, a resistance 125 and a second condenser 126.

In the steady state the condenser 124 is charged to the voltage $Vp$. When the error changes $Vp$ also changes and a voltage appears across the resistance 125 proportional to the rate of change of the error. This voltage is applied to the selected integrating condenser 104, 105, 106, and hence changes the output of the valve 115, adding a component proportional to the derivative. The resistance 125 is variable in order to adjust the derivative action time and consists of a potentiometer ganged to a second potentiometer resistance 127. The function of the second potentiometer resistance 127 is to enhance the response of the valve 115 to the derivative signal by the shunting effect of the resistance 127 and the condenser 126 across the cathode resistance 119 during transient conditions. Thus it will be seen that the anode current of the valve 115 includes a component proportional to both the integral and the derivative of the error, while the anode current of the valve 100, together with the current from the source 101, gives a resultant current directly proportional to the error. This latter current is shown by a meter 130 and the total current, i.e. that containing components proportional to the error, the integral of the error and the derivative of the error, represents the output of the controller and is shown by the meter 131. This output current then passes by way of conductors shown in dotted lines as 132 and 133 to the regulating member 134 which is shown diagrammatically as a flow control valve.

The controller is extremely flexible since all the important controlling factors can be adjusted extremely simply. As previously described, the desired value is controlled by adjustment of the potentiometer resistance 92 and in addition to this a further resistance 135 is included which is connected to terminals 136. The purpose of this resistance is to enable the output of a further controller or any other suitable direct current signal to be used as, or in addition to, the desired value voltage. The proportional band is controlled by adjustment of the resistances 96 and 103 and the integral time is selected by means of the appropriate integral condenser 104, 105 or 106. Finally, the derivative action time is adjusted by means of the ganged potentiometers 125 and 127.

The use of the units 116 and 120 each comprising the basic circuit in accordance with the present invention for establishing the integral and derivative components in the controller output, ensures that these components are isolated from one another and are independent of one another. In addition, the presence of these units makes the performance of the controller much closer to the theoretical ideal by greatly reducing the imperfections of the simple resistance/condenser integrating circuit. A further advantage obtained is the inherent limitation of the controller action in the event of failure or breakdown.

If a breakdown should occur such as failure of the regulating member 134, or some other part of the equipment not shown in the drawings, for instance pumping machinery, a loss of control will result and an error will therefore be fed into the integrating circuit. Ideally the controller should take this error into account until its output reaches either a maximum or minimum, after which it should cease to respond to the error since it can no longer take corresponding corrective action. If the integrating circuit should continue to operate indefinitely it would be most difficult to restore normal conditions as soon as the original breakdown was corrected.

The response of the controller shown in FIGURE 6 to conditions of this kind is most easily described with reference to the integrating circuit of FIGURE 4. Normally an error appearing at the terminals 40 is integrated until the anode current of the valve 44 reaches a maximum, after which further increase in the voltage on the condenser 41 will not cause any further increase in the current. Under these circumstances the voltage across the resistance 43 will be less than that across the condenser 41, the back voltage of the condenser will not be canceled out and integration will no longer be linear. If the error applied at the terminals 40 is in the opposite direction it will cause the anode current of the valve 44 to drop to zero leading to the voltage across the resistance 43 also becoming zero. Since neither the anode current of the valve nor consequently the voltage across the resistance 43 can become negative linear integration will again cease and the voltage across the condenser 41 will increase exponentially.

The result of this in practice is that the integrating circuit of the controller of FIGURE 6 operates linearly with errors which are within the capacity of the controller but effectively ignores errors beyond this capacity. This feature is particularly useful both during temporary plant failures and also during starting up. In a similar way the derivative circuit of FIGURE 5 is also self-limiting since it becomes saturated by the application of a signal outside its capacity. In general, however, the derivative signal is not likely to become excessive and consequently the controller of FIGURE 6 includes a normal form of derivative circuit although that of FIGURE 5 can be used if required.

We claim:

1. An electrical circuit for carrying a direct current representing a physical quantity, said circuit including means for controlling said direct current to represent said physical quantity, a full wave rectifier supplying said direct current and having alternating current input terminals, a source of alternating current connected to said input terminals, a current transformer having primary and secondary windings, said primary winding being connected in series with said full wave rectifier terminals and the source of alternating current so that substantially all of the current flowing through the primary winding of said current transformer is directly proportional to the direct current representing said physical quantity, a resistance carrying the current flowing in said secondary winding and means for tapping off the voltage across said resistance, said voltage being substantially proportional to said direct current.

2. A circuit according to claim 1, for use as a direct current amplifier, in which the rectifier is connected to supply the anode current of a thermionic valve whose grid potential is controlled by the signal to be amplified, and the voltage derived from the secondary winding of the transformer is rectified and applied to the grid of a second valve whose anode current represents the amplified output of the circuit.

3. A circuit according to claim 2, in which the anode current of the second valve is supplied by a further full-wave rectifier having the primary winding of a further current transformer connected in its alternating current input circuit and the rectified voltage derived from a resistance connected in the secondary circuit of the transformer is fed back to the signal to be amplified so as to improve the linearity of amplification and the input impedance.

4. A circuit according to claim 1 for integrating an applied voltage, in which the rectifier is connected to supply the anode current of a thermionic valve whose grid potential is controlled by the voltage across a condenser charged through a resistance by the voltage to be integrated, and the voltage derived from the secondary winding of the transformer is proportioned so as to be equal to that across the condenser, being rectified and fed back in opposition to the voltage across the condenser so as to render the integration linear.

5. A circuit according to claim 1 for differentiating an applied voltage, in which the rectifier is connected to supply the anode current of a thermionic valve whose grid potential is controlled by the voltage across a resistance connected in series with a condenser charged through the resistance by the voltage to be differentiated and the voltage derived from the secondary winding of the transformer is proportioned so as to be equal to that across the resistance, being rectified and fed back in opposition to the voltage across the resistance.

6. An electrical controller in which the anode current of a thermionic valve is adjusted in accordance with the measured value of the quantity to be controlled and a voltage proportional to this current is derived by means of a circuit according to claim 1.

7. An electrical controller according to claim 6, in which the voltage proportional to the measured value of the quantity to be controlled is connected in opposition to a voltage correspondingly proportional to the desired value of the said quantity, the resultant voltage, which is thereby proportional to the error in the system, being applied to control the grid potential of a second thermionic valve, the anode current of which flows to the output circuit in opposition to a steady direct current of magnitude equal to that of the anode current of the valve when the error in the system is zero, thereby giving a resultant current proportional to the error.

8. An electrical controller according to claim 7 in which the resultant current is caused to flow through a resistance, the voltage across which is integrated by means of a circuit which includes a second full wave rectifier having the primary winding of a second current transformer connected in its alternating current input circuit and the secondary of said second current transformer includes a resistance across which appears a voltage substantially proportional to the direct current in the circuit, means connecting said second rectifier to supply the anode current of a thermionic valve whose grid potential is controlled by the voltage across a condenser charged through a resistance by the voltage to be integrated, and the voltage derived from the secondary winding of the second current transformer is proportioned so as to be equal to that across the condenser, being rectified and fed back in opposition to the voltage across the condenser so as to render the integration linear.

9. An electrical controller according to claim 8 in which a voltage proportional to the anode current of a second thermionic valve is derived by means of a circuit which includes a third full wave rectifier circuit having the primary winding of a current transformer connected in its alternating current input circuit and the secondary of said third current transformer includes a resistance across which appears a voltage substantially proportional to the direct current in the circuit, and this voltage being differentiated by means of a differentiating network, the voltage representing the derivative being applied to the grid of the valve in the integrating circuit in addition to the voltage across the integrating condenser, with the result that the anode current of this valve contains components proportional both to the integral and the derivative of the error.

10. An electric circuit according to claim 1, in which losses in the rectifier are allowed for by the provision of an additional primary winding acting in opposition to the first and carrying a current representative of the rectifier loss.

11. A circuit according to claim 10 for use as a direct current amplifier, in which the rectifier is connected to supply the anode current for a thermionic valve whose grid potential is controlled by the signal to be amplified, and the voltage derived from the secondary winding of the transformer is rectified and applied to the grid of a second valve whose anode current represents the amplified output of the circuit.

12. A circuit according to claim 11 in which the anode current of a second valve is supplied by a further full-wave rectifier having the primary winding of a further current transformer connected in its alternating current input circuit and the rectified voltage derived from a resistance connected in the secondary circuit of the further current transformer is fed back to the signal to be amplified so as to improve the linearity of amplification and the input impedance.

13. A circuit according to claim 10 for integrating an applied voltage in which the rectifier is connected to supply the anode current of a thermionic valve whose grid potential is controlled by the voltage across a condenser charged through a resistance by the voltage to be integrated, and the voltage derived from the secondary winding of the transformer is proportioned so as to be equal to that across the condenser, being rectified and fed back in opposition to the voltage across the condenser so as to render the integration linear.

14. A circuit according to claim 10 for differentiating an applied voltage, in which the rectifier is connected to supply the anode current of a thermionic valve whose grid potential is controlled by the voltage across a resistance connected in series with a condenser charged through the resistance by the voltage to be differentiated and the voltage derived from the secondary winding of the transformer is proportioned so as to be equal across the resistance, being rectified and fed back in opposition to the voltage across the resistance.

15. An electrical controller in which the anode current of a thermionic valve is adjusted in accordance with the measured value of the quantity to be controlled and a voltage proportional to this current is derived by means of a circuit according to claim 10.

16. An electrical controller according to claim 15 in which the voltage proportional to the measured value of the quantity to be controlled is connected in opposition to a voltage correspondingly proportional to the desired value of the said quantity, the resultant voltage, which is thereby proportional to the error in the system, being applied to control the grid potential of a second thermionic valve, the anode current of which flows to the output circuit in opposition to a steady direct current of magnitude equal to that of the anode current of the valve when the error in the system is zero, thereby giving a resultant current proportional to the error.

17. In an electric circuit, a full-wave rectifier, a source of alternating current supplying said rectifier, a current transformer having primary and secondary windings, the primary winding of said transformer being connected in series with said current source and said rectifier, a resistance connected across the secondary winding of said transformer, and means for controlling the current flowing through said series connected primary winding including a device for controlling the direct current output of said rectifier, whereby the voltage across said resistance varies directly with the direct current output of said rectifier.

18. An integrating circuit comprising a pair of input terminals, a first resistance, a second resistance, a capacitor, means connecting said first and second resistances and said capacitor in series with said terminals, a thermionic tube, means applying the voltage across said capacitor between the grid and cathode of said tube, a first full-wave rectifier connected to supply the plate current of said tube, a source of alternating current connected to said rectifier, a current transformer having primary and secondary windings, the primary winding of said transformer being connected between said source and said first rectifier, and a second full-wave rectifier connected to the secondary winding of said transformer, the direct current output of said second rectifier being connected to said second resistance to oppose the voltage across said capacitor.

19. An electrical controller for controlling the magnitude of a physical quantity in a system subject to variation from a desired value, said controller comprising means for establishing a direct current proportional to the measured value of said physical quantity, means for establishing a voltage proportional to said current, means for establishing a voltage correspondingly proportional to said desired value, means for opposing said two voltages to give a resultant voltage proportional to the error in said system, a first thermionic tube, means for applying said error voltage between the grid and cathode of said tube, a first full-wave rectifier connected to supply the plate current of said tube, a source of alternating current connected to said rectifier, a current transformer having primary and secondary windings, the primary winding of said transformer being connected between said source and said first rectifier, and a second full-wave rectifier connected to the secondary winding of said transformer, a differentiating network, means connecting the direct current output of said second rectifier to said differentiating network, a resistance connected to carry the plate current of said first thermionic tube, a linear integrating network, means connecting the voltage across said resistance to said integrating network, a second thermionic tube, a source of plate current for said tube, means for adding the voltage outputs of said differentiating network and said integrating network, means for applying said addition voltage between the grid and cathode of said second thermionic tube, means for adding the plate currents of said first and second thermionic tubes, to give a controller output current including components proportional to the error in said system, to the integral of the error and to the derivative of the error, and means responsive to said controller output current for regulating said physical quantity.

20. An electric circuit for carrying a direct current representing a physical quantity, comprising a full wave rectifier circuit having a first pair and a second pair of terminals, means comprising a control device connected across said first pair of terminals, a current transformer having a primary and a secondary winding, a source of alternating current, means connecting said alternating current source and the primary winding of said current transformer in series circuit with said second pair of terminals whereby the alternating current flowing in said series circuit is directly proportional to the direct current flowing through said first pair of terminals, and a resistance connected across said secondary winding of said current transformer for causing a voltage drop which is substantially proportional to the direct current applied to said first pair of terminals.

References Cited in the file of this patent

UNITED STATES PATENTS

| | | |
|---|---|---|
| 1,822,929 | Hund | Sept. 15, 1931 |
| 2,275,308 | Niemann | Mar. 3, 1942 |
| 2,832,032 | Walker et al. | Apr. 22, 1958 |